US006869700B2

(12) United States Patent
Sawa et al.

(10) Patent No.: US 6,869,700 B2
(45) Date of Patent: Mar. 22, 2005

(54) SOFT MAGNETIC ALLOY FIBER, MANUFACTURING METHOD FOR SOFT MAGNETIC ALLOY FIBER, AND INFORMATION RECORDING ARTICLE USING SOFT MAGNETIC ALLOY FIBER

(75) Inventors: Takao Sawa, Kanagawa-ken (JP); Katsutoshi Nakagawa, Kanagawa-ken (JP); Hisashi Takahashi, Kanagawa-ken (JP); Teruo Murakami, Kanagawa-ken (JP); Masao Obama, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 71 days.

(21) Appl. No.: 10/446,813

(22) Filed: May 29, 2003

(65) Prior Publication Data

US 2003/0207144 A1 Nov. 6, 2003

Related U.S. Application Data

(62) Division of application No. 09/801,741, filed on Mar. 9, 2001, now Pat. No. 6,610,425.

(30) Foreign Application Priority Data

Mar. 17, 2000 (JP) ....................................... 2000-076523

(51) Int. Cl.$^{7}$ .............................. B32B 5/02; H01F 1/00

(52) U.S. Cl. ................................ 428/694 BA; 428/611; 428/692

(58) Field of Search .......................... 428/694 BA, 611, 428/692

(56) References Cited

U.S. PATENT DOCUMENTS

| | | | | | |
|---|---|---|---|---|---|
| 4,221,257 | A | | 9/1980 | Narasimhan | |
| 4,473,417 | A | | 9/1984 | Inomata et al. | |
| 5,015,993 | A | | 5/1991 | Strom-Olsen et al. | |
| 5,198,040 | A | | 3/1993 | Sawa et al. | |
| 5,220,338 | A | | 6/1993 | Matsushita | |
| 5,220,339 | A | | 6/1993 | Matsushita | |
| 5,334,262 | A | | 8/1994 | Sawa et al. | |
| 5,522,948 | A | | 6/1996 | Sawa et al. | |
| 5,552,948 | A | | 9/1996 | Sawa et al. | |
| 5,757,272 | A | * | 5/1998 | Herzer et al. | 340/572.1 |
| 5,825,290 | A | * | 10/1998 | Lian et al. | 340/572.6 |
| 6,011,475 | A | * | 1/2000 | Herzer | 340/572.6 |
| 6,103,396 | A | | 8/2000 | Das et al. | |
| 6,313,746 | B1 | * | 11/2001 | Emmerich et al. | 340/572.2 |
| 6,371,379 | B1 | * | 4/2002 | Dames et al. | 235/493 |

FOREIGN PATENT DOCUMENTS

| | | |
|---|---|---|
| EP | 0 833 351 | 4/1998 |
| JP | 53-12719 | 2/1978 |

* cited by examiner

*Primary Examiner*—John J. Zimmerman
*Assistant Examiner*—Jason L Savage
(74) *Attorney, Agent, or Firm*—Pillsbury Winthrop LLP

(57) ABSTRACT

A soft magnetic alloy fiber has a width of 10 μm or more to less than 500 μm, a thickness of 2 μm or more to less than 20 μm, and a Curie temperature of −50° C. or higher.

11 Claims, 6 Drawing Sheets

SOFT MAGNETIC ALLOY FIBER, MANUFACTURING METHOD FOR SOFT MAGNETIC ALLOY FIBER, AND INFORMATION RECORDING ARTICLE USING SOFT MAGNETIC ALLOY FIBER

This is a Divisional Application of U.S. application Ser. No. 09/801,741 filed Mar. 9, 2001, now U.S. Pat. No. 6,610,425 which claims priority from Japanese Patent Application No. 2000-076523. which was filed Mar. 17, 2000, the entire contents of both of which are incorporated herein by reference.

BACKGROUND OF THE INVENTION

1. Field of the Invention

The present invention relates to information recording articles requiring various kinds of forgery prevention such as Shinkansen reserved tickets issued by travel agencies and ticket centers, tickets having the value printed on specific forms such as concert tickets, and securities such as bank tickets, bills, stocks, and gift certificates, soft magnetic alloy fibers to be embedded in bases of such articles for forgery prevention, a manufacturing method for soft magnetic alloy fibers, and information recording articles using soft magnetic alloy fibers.

2. Description of the Related Art

Forgery preventive measures for notes as money, securities, and cards having the value equal to cash are taken.

As such a measure, for example, there is a method available for printing security information on a paper sheet with magnetized ink and magnetically detecting the security information. Further, there is another method available for putting a metallic piece with a plate thickness of 20 μm and a width of 0.5 to 1.0 mm into the paper base beforehand and detecting the metallic piece. Furthermore, there is still another method available for mixing metallic fibers such as stainless steel pretreated by a water soluble binder in the paper base and detecting metallic fibers by the electromagnetic property, magnetic property, electromagnetic wave absorptivity, and heat conductivity. There is a further method available for mixing carbon fibers coated with a ferromagnetic metal such as nickel in the paper base and detecting carbon fibers by the electrical measurement such as electromagnetic property measurement, the electromagnetic wave measurement such as microwave inspection, or the magnetic measurement. Furthermore, there is a still further method available for mixing together magnetic polymeric elements composed of a macromolecular material containing magnetic metallic powder irregularly in an information recording medium and magnetically reading magnetic polymeric elements by an MR element (magneto resistance element). Further, there is yet a further method available for reading fibers composed of a magnetic material by a magnetic head in an information recording medium that fibers composed of a magnetic material are mixed together in a base composed of a nonmagnetic material in an optional dispersion state and a plurality of aforementioned bases are laminated integratedly.

In the aforementioned forgery preventive measures, magnetic output detection capable of high-speed reading comparatively easily is generally used for validity determination.

Among the forgery preventive measures, for example, when a metallic piece with a width of 0.5 to 1 mm is to be put into the paper base, the material to be inserted is too thick and a problem is imposed in use. In this case, when a metallic piece of the aforementioned dimension and a metal wire of about 100 to 200 μm in diameter are embedded in a paper, the flexibility of paper sheet in the embedded portion is lost and the shade is often ascertained when looked through, so that there is the possibility of easy forging.

Further, for example, when magnetic polymeric elements with magnetic powder dispersed are to be detected by the MR element, compared with a bulky material of high magnetic permeability, a polymer material such as a polymer which contains magnetic powder and is formed in an extremely fine wire shape is greatly reduced in magnetic permeability. Therefore, in order to read those embedded elements by an MR head, the SN ratio is too small. Further, since a weak signal is handled the reader often requires installation of a magnetic shield and there are many factors for an increase in cost.

Furthermore, when a plurality of bases with fibers composed of a magnetic material coexisting are laminated, the information amount is increased. However, there is a difference in output caused between samples inside the laminate and samples in the neighborhood of the surface and the forgery preventive effect is lower though an increase in cost is required.

As represented by cards or bills, information-recording articles are mostly in a thin paper sheet form. Therefore, magnetic elements coated on or embedded in their surfaces are preferably to be in an extremely fine wire shape or a thin magnetic coating layer. When magnetic reading is to be executed, a material of high magnetic permeability is desirable from the viewpoint of material. As such a material, for example, permalloy, ferrite magnetic powder, and amorphous wire may be cited. However, permalloy must be rolled into a thin plate and it is not practical from the viewpoint of cost. Ferrite magnetic powder is applicable only to magnetic ink and it is technically difficult to produce a long wire. An amorphous wire has a diameter of about 100 to 200 μm under restrictions of the manufacturing conditions. However, when it is drawn into a diameter of several tens μm so as to insert into paper sheets, the magnetic property is deteriorated greatly. Therefore, it is not practical for validity determination.

Furthermore, when a metallic piece or a thread is embedded for the purpose of forgery prevention, if it is large in form, it may be taken out easily and it cannot be said from the viewpoint of forgery prevention that it is desirable.

SUMMARY OF THE INVENTION

An object of the present invention is to provide soft magnetic alloy fibers which can be easily compounded with a base, are high in the security property and forgery preventive effect, and can read at high output and high speed.

Another object of the present invention is to provide an information recording article which is high in the security property and forgery preventive effect, can read at high output and high speed, and can determine the validity easily.

Still another object of the present invention is to provide a manufacturing method for soft magnetic alloy fibers for easily manufacturing soft magnetic alloy fibers which can be easily compounded with a base, are high in the security property and forgery preventive effect, and can read at high output and high speed.

According to the present invention, soft magnetic alloy fibers are provided and the soft magnetic alloy fibers have a width of 10 μm or more to less than 500 μm, a thickness of 2 μm or more to less than 20 μm, and a Curie temperature of −50° C. or higher.

Furthermore, according to the present invention, an information recording article is provided and the information recording article comprises a base and soft magnetic alloy fibers having a width of 10 μm or more to less than 50 μm, a plate thickness of 2 μm or more to less than 20 μm, and a Curie temperature of −50° C. or higher which are embedded in the base.

Further, according to the present invention, a manufacturing method for soft magnetic alloy fibers is provided and the manufacturing method comprises a step of dissolving a soft magnetic alloy material in a crucible with a nozzle having an opening with a diameter of 0.1 to 0.2 mm or a slit having a short side of 0.07 to 0.15 mm in length and a long side of 0.1 to 2 mm in length to obtain a molten alloy; and a step of injecting and cooling the molten alloy on a cooler rotating at a peripheral speed of 20 to 50 m/s in an atmosphere at pressure 10 to 750 Torr higher than the peripheral atmosphere.

DETAILED DESCRIPTION OF THE PREFERRED EMBODIMENTS

Figure 1:
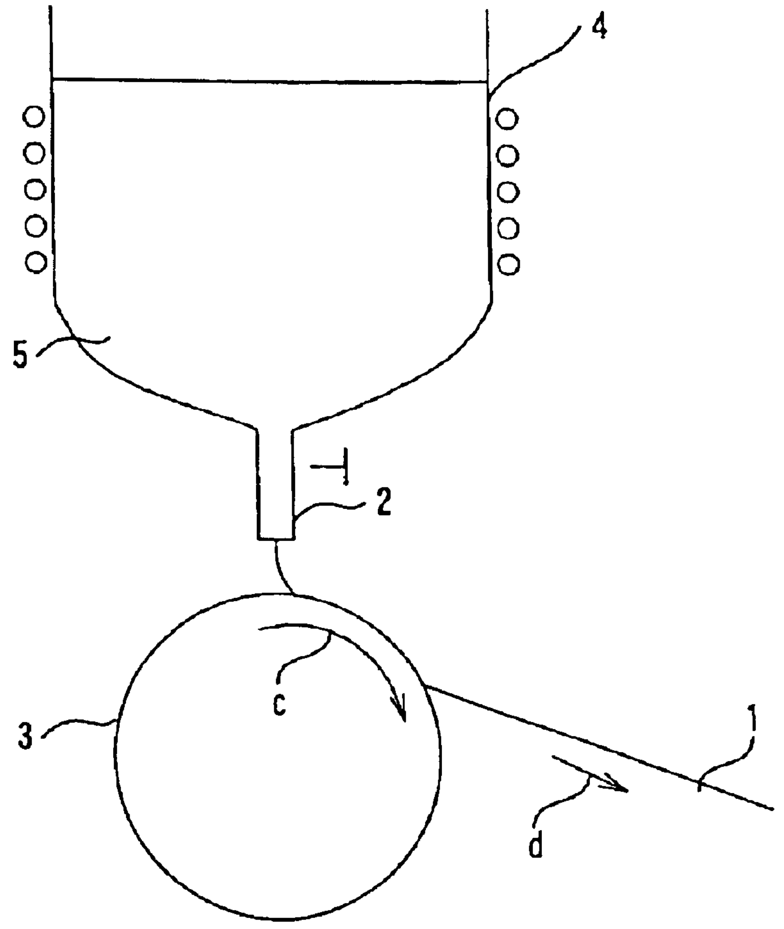
FIG. 1 is a schematic view for explaining an example of the manufacturing method for alloy fibers used in the present invention.

The inventors studied earnestly so as to realize security information recording which is high in the security property and forgery preventive effect, consequently found a suitable security information recording material composed of soft magnetic alloy fibers, and developed the present invention.

Soft magnetic alloy fibers relating to the first viewpoint have a width of 10 μm or more to 500 μm, a thickness of 2 μm or more to less than 20 μm, and a Curie temperature of −50° C. or higher.

The soft magnetic alloy fibers of the present invention have output sufficient to magnetic detection, can be easily compounded with a base, cannot be visually recognized easily from the compounded base, and cannot be taken out easily as a simple, so that the soft magnetic alloy fibers can read at high speed and are excellent in the security property and forgery preventive effect.

When the soft magnetic alloy fibers of the present invention are 500 μm or more in width, the existence of a security article is visually clear and furthermore, when they are bent, they may be exposed or torn off from the base and the security property is reduced. When the width is less than 10 μm, the output when the soft magnetic alloy fiber property is to be detected magnetically is made excessively smaller and the validity determination becomes difficult.

On the other hand, when the thickness is 20 μm or more, the portion occupied by the soft-magnetic ally fibers in the base becomes excessively large and the base is easily damaged by mechanical bending or others, so that the durability of the base is reduced. Further, the alloy fibers may appear on the surface or may be torn off and easily taken out, so that the security property and forgery preventive effect is reduced.

When the thickness is less than 2 μm, in the case of magnetic reading, the output is too small, thereby magnetic detection is difficult and validity determination is not easy.

The shape dimensions of the soft magnetic alloy fibers of the present invention are preferably 20 to 300 μm in width and 4 to 15 μm in plate thickness and more preferably 30 to 200 μm in width and 5 to 13 μm in thickness, though when the main fibers (50% or more) are within this range, it is acceptable.

The Curie temperature of the soft magnetic alloy fibers of the present invention is −50° C. or higher. The Curie temperature is within the temperature range effective to set the detection output to 0 or a fixed value or more under control of the detection temperature. By doing this, binary coding (coding of several values) or control of the output waveform can be executed and a higher security property can be provided. When the Curie temperature is lower than −5° C., the detection output becomes extremely small. A preferable Curie temperature is between −50° C. and 500° C.

A more preferable Curie temperature is between −50° C. and 150° C. When the Curie temperature is more than 150° C., the output may not disappear sufficiently due to ununiformity of heat emission. A still more preferable Curie temperature is between −20° C. and 120° C. and a particularly preferable Curie temperature is between 0° C. and 80° C. When a plurality of fibers are used and a plurality of Curie temperatures are to be set, Curie temperatures of −50° C. or higher can be set optionally.

The information recording article relating to the second viewpoint has a base and a security information recording material embedded in the base and the security information recording material is composed of soft magnetic alloy fibers with a width of 10 μm or more to less than 50 μm and a thickness of 2 μm or more to less than 20 μm having a Curie temperature of −50° C. or higher.

The base is preferable to be a nonmagnetic material such as a paper sheet or plastics.

Particularly, when the base is a paper sheet, by a combination with the soft magnetic alloy fibers of the present invention, a particularly satisfactory security property can be realized.

As a method for embedding soft magnetic alloy fibers in the base, for example, when the base is a paper sheet, soft magnetic alloy fibers are arranged on a paper sheet immediately after manufactured, and another paper sheet is overlaid on it, and they are hot-pressed so as to be laminated.

Or, when soft magnetic alloy fibers are arranged in a predetermined position or at random at the time of paper manufacture, they can be embedded. Or, soft magnetic alloy fibers are dispersed in a plastic film and they may be inserted at least in a part of a paper sheet.

In this case, the ratio of the sectional area (Ap) of fibers of the paper sheet to the sectional area (Am) of the soft magnetic alloy fibers is preferable to be $0.1 \leqq Ap/Am \leqq 20$.

When the ratio of Ap to Am is within the aforementioned range, the drapeability with paper sheet fibers is extremely satisfactory and highly reliable and furthermore, when the property of the inserted soft magnetic alloy fibers is detected, an information-recording article of an extremely high security property can be realized.

Here, the image process calculates the sectional areas of 20 fibers or soft magnetic alloy fibers observed by an SEM (Scanning Electron Microscope) and a mean value thereof is obtained.

When Ap/Am is less than 0.1, the detection sensitivity becomes extremely low and when it is more than 20, the drapeability with paper fibers is not good, and the alloy fibers can be easily disconnected, and it is cleat that the soft magnetic alloy fibers for security are easily inserted into the paper sheet. Therefore, the security property is apt to be lost.

When the base is plastic, soft magnetic alloy fibers are arranged on a plastic film, and another plastic film is overlaid on it, and both are heated and adhered or fused, thereby they can be laminated.

Or, when soft magnetic alloy fibers are mixed into fused plastics and then formed in a predetermined thickness, they can be embedded.

The soft magnetic alloy fibers are preferable to have a length of 0.1 mm or longer. When the length is smaller than 0.1 mm, a signal is too small to detect the alloy fibers.

On the other hand, there is no upper limit of the length particularly and when the alloy fibers can be put into one information recording article, it is acceptable. In this case, the fibers may be inserted linearly or may be meandered optionally. The length is preferably 200 mm or less from the viewpoint of security property in terms of sight.

For detection of soft magnetic alloy executing excitation and detection at an optional position can use fibers of the present invention, a method for measuring the output voltage by contact or noncontact. It is preferable from the viewpoint of the magnitude of output that the excitation direction and detection direction is the same. For detection, the same frequency as the excited frequency may be used, though detection at a high frequency is advantageous from the viewpoint of noise. At the time of output detection, the sensor width can be detected from the detection width.

The information recording article of the present invention has a base composed of a nonmagnetic material and soft magnetic alloy fibers with a width of 10 $\mu$m or more to less than 500 $\mu$m and a thickness of 2 $\mu$m or more to less than 20 $\mu$m selectively embedded in the assumed matrix-like divided area on the base and the existence of embedding of soft magnetic alloy fibers can be determined in validity as recording information.

In this case, when the aforementioned detection method is used and the change in the detection output pattern due to temperature setting and the matrix information are combined, information of a high security property can be set. When the division width of matrix is freely set, the information can be changed and when the information is additionally coded so as to digitize, forging is extremely difficult.

As soft magnetic alloy fibers of the present invention, it is preferable to use an amorphous alloy that can obtain high sensitivity from the viewpoint of magnetic property detection.

Particularly, the aforementioned amorphous alloy is preferable to be a material expressed by the following general formula from the viewpoint of high sensitivity.

$$(Co_{1-a-b}Fe_aM_b)_{100-x}(Si_{1-c}B_c)_x \quad (1)$$

Where M is at least one selected from Ti, V, Cr, Mn, Ni, Cu, Zr, Nb, Mo, Hf, Ta, and W, $0 \leqq a \leqq 0.15$, $0 \leqq b \leqq 0.20$ (in the case of Ni, up to 0.50), $0.2 \leqq c \leqq 1.0$, and $10 \leqq x \leqq 40$ (atomic %)

Among them, Fe can make the magnetic distortion equal to zero depending on the ratio to Co and it is preferable because the magnetic property can be suppressed from deterioration at the time of arrangement. The range is less than 0.15 and preferably from 0.02 to 0.12.

M indicates an element for improving the soft-magnetic property and the output property can be improved by it. However, in consideration of binary coding under control of the Curie temperature, the range is preferable to be less than 0.20 and more preferable to be less than 0.15.

When M is Ni, it is preferable to be replaced with up to 0.5 from the viewpoint of control of the Curie temperature.

Si and B are elements that are preferably used for amorphous formation. When the amount is less than 10 atomic percentage, amorphous formation is difficult and when the amount is more than 40 atomic percentage, the Curie temperature is apt to be extremely low. Particularly, when the amount of Ni is increased, the melting point of the alloy is lowered comparatively, so that a target material can be particularly produced easily.

An Fe group amorphous alloy expressed by the following general formula (2) can be used:

$$(Fe_{1-m}T_m)_{100-y}(Si_{1-n}B_n)_y \quad (2)$$

Where T is at least one selected from Co, Ni, Ti, Zr, Hf, V, Nb, Ta, Cr, Mo, W, Cu, Mn, Al, and Ga, $0 \leqq m \leqq 0.15$ (in the case of Co, up to 0.2 and in the case of Ni, up to 0.7), $0.2 \leqq n \leqq 1$, and $10 \leqq y \leqq 40$ (atomic %)

An Fe group alloy may be an alloy that an alloy which is made amorphous once is heat-treated at the crystallization temperature and fine crystal particles with a mean crystal particle diameter of 5 nm or more to 50 nm or less, preferably 10 nm to 30 nm are deposited at an area ratio of 50% or more. In this case, particularly an alloy expressed by the following general formula (3) is preferable because it realizes an excellent soft-magnetic property and also realizes high sensitivity.

$$(Fe_{1-d}M1_d)_{100-e-f-g-h-j}Cu_eM2_fT_gSi_hB_j \quad (3)$$

Where M1 is at least one selected from Co and Ni, M2 is at least one selected from Ti, V, Zr, Nb, Mo, Hf, Ta, and W, T is at least one selected from Cr, Mn, Sn, Al, and Ga, $0 \leqq d \leqq 0.6$, $0.01 \leqq e \leqq 5$, $0.1 \leqq f \leqq 10$, $0 \leqq g \leqq 5$, $0 \leqq h \leqq 25$, and $2 \leqq j \leqq 30$ (atomic %)

Particularly, for control for a low Curie temperature, Ni replacement of up to 60% to Fe is most preferable. The mean crystal particle diameter can be obtained by direct observation by the TEM evaluation or by the Scherrer formula from diffraction rays of X-ray diffraction.

In the information recording article of the present invention, when paper sheets are used as a base and to be combined with soft magnetic alloy fibers and particularly when fibers are to be mixed beforehand at the time of paper manufacture by the wet paper manufacturing method, from the viewpoint of corrosion resistance, a Co group amorphous alloy is preferable. In this case, in order to improve the corrosion resistance of an Fe group alloy, it is desirable to add Cr.

With respect to the alloy fibers of the present invention, when the magnetic property is changed by heat treatment, and for example, magnitude levels of the coercive force are set, and a plurality of detection heads under different excitation conditions are used, a predetermined detection pattern is obtained and the validity can be determined.

In this case, alloy fibers having large coercive force do not need to be an amorphous alloy and for example, in the case of a Co group alloy, it may be an alloy that is crystallized in the same composition from the amorphous phase.

According to the present invention, the soft magnetic alloy material is referred to as a material having coercive force of 8,000 A/m or less. Preferable coercive force is 0.08 to 800 A/m.

Furthermore, when alloy fibers of small coercive force relating to the present invention and magnetic ink composed of various magnetic oxides having comparatively large coercive force are combined and a plurality of detection heads under different excitation conditions in the same way as with the aforementioned are used, a predetermined detection pattern is obtained and the validity can be determined.

As such magnetic oxide powder, NiZn ferrite, MnZn ferrite, CuZn ferrite, and garnet series ferrite may be cited.

The invention relating to the third viewpoint indicates an example of the manufacturing method suited to the aforementioned soft magnetic alloy fibers. This manufacturing method houses a molten material obtained by fusing a soft magnetic alloy material in a decompressed crucible with a nozzle. The manufacturing method includes a step of injecting the molten material from the crucible onto the cooler rotating at high speed and forming it in a fiber shape by cooling it rapidly. The nozzle of the crucible has an opening with a diameter of 0.1 to 0.2 mm or a slit having a short side of 0.07 to 0.15 mm in length and a long side of 0.1 to 2 mm in length. The difference pressure between inside the crucible and the peripheral atmosphere is 10 to 750 Torr. The cooler rotates at a peripheral speed of 20 to 50 m/s.

In the manufacturing method of the present invention, as mentioned above, a single roll method using a nozzle capable of obtaining a target width and thickness at reduced pressure for injecting a molten material prepared so as to obtain a predetermined composition onto a roll rotating at high speed is preferably used. The material obtained by this manufacturing method does not require the secondary processing such as rolling and wire drawing and alloy fibers free of property deterioration due to processing can be produced at a low cost.

Particularly, when an alloy in a fusion state is to be injected from the aforementioned nozzle, by injecting it under the negative pressure condition, that is, at minute differential pressure from the atmospheric pressure in the chamber, alloy fibers under the aforementioned specification that is stably long can be produced.

FIG. 1 shows a drawing for explaining an example of the manufacturing method for alloy fibers used in the present invention.

Figure 2:
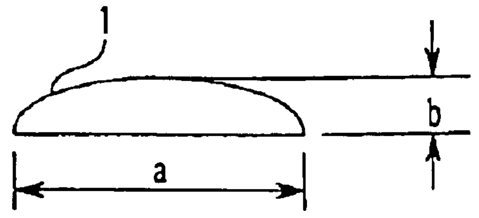
FIG. 2 is a cross sectional view of an alloy fiber in the width direction used in the present invention.

FIG. 2 shows a cross sectional view of an alloy fiber in the width direction used in the present invention. In the drawing, numeral 1 indicates an alloy fiber and a and b indicate a width and a plate thickness respectively. The plate thickness may be obtained by calculation after cutting an alloy fiber in a certain length and measuring the width, weight, and material density and the plate thickness and width measured on the enlarged section obtained by an SEM may be used.

The alloy fibers used in the present invention, as shown in FIG. 1, can be produced by a device composed of, for example, a rotary cooling roll 3, a crucible 4 for housing a molten material which is installed above the cooling roll 3, and an injection nozzle 2 installed on the lower part of the crucible 4.

In this device, the mother alloy is fused in the crucible 4 by high frequency induction heating and then a molten material 5 is injected onto the cooling roll 3 rotating in the direction of the arrow c from the injection nozzle 2 and cooled rapidly. The molten material 5 is conveyed in the direction of the arrow d by this rapid cooling and the alloy fiber 1 as obtained. In this case, when the cooling roll 3 is composed of, for example, an iron alloy or a copper alloy and the shape of the molten material injection outlet at the end of the injection nozzle 2 is made circular, the diameter is within the range from 0.1 to 0.2 mm. When the shape of the molten material injection outlet is made rectangular, the short side positioned in parallel with the peripheral direction of the cooling roll 3 is within the range from about 0.07 to 0.15 mm and the long side positioned perpendicularly to the peripheral direction is within the range from about 0.1 to 2 mm. The cooling roll rotates at a peripheral speed within the range from about 20 to 50 m/s. It is desirable that the preparation atmosphere is reduced to pressure of 760 Torr or less, and the differential pressure from inside the crucible is set to 10 to 750 Torr, and the molten material 5 is injected onto the cooling roll 3 from the injection nozzle 2 at the aforementioned weak differential pressure. By doing this, an alloy fiber with a width of 10 $\mu$m or more to less than 500 $\mu$m and a plate thickness of 2 $\mu$m or more to less than 20 $\mu$m can be produced. Many molten material injection outlets may be provided from the viewpoint of production efficiency.

The present invention will be explained more in detail hereunder by indicating the embodiments.

EMBODIMENT 1 AND COMPARISON EXAMPLE 1

An amorphous alloy fiber with a width of 30 to 50 $\mu$m and a plate thickness of 8 to 10 $\mu$m is produced by way of trial for the purpose of obtaining a long sample of 1 km by injecting a soft magnetic alloy material expressed by $(Co_{0.85}Fe_{0.05}Cr_{0.10})_{75}(Si_{0.5}B_{0.5})_{25}$ using the device shown in FIG. 1.

The roll material is BeCu, and the peripheral speed of the roll is 30 m/s, and the nozzle shape is circular with a diameter of 0.1 mm, and the preparation atmosphere is 400 Torr or less, and the gap between the roll and the nozzle end is 0.15 mm.

The obtained thin amorphous alloy band is cut into pieces with a length of 25 mm and about 30 pieces are suitably arranged on a paper layer immediately after manufactured and dehydrated. Another paper layer immediately after manufactured and dehydrated is additionally overlaid on it and the whole is hot-pressed and then dried so as to form one paper having a thickness of about 80 $\mu$m.

The paper is punched, for example, in a size (70 mm×165 mm) like a beer coupon ticket which can be exchanged for beer so as to obtain information recording articles. With respect to the mean sectional area of fibers of the paper, 20 pieces are observed on the sectional area with a scanning electron microscope and it is ascertained by the image process that the mean sectional area is 360 $\mu m^2$.

On the other hand, as Comparison example 1, an amorphous alloy $Co_{75}(Si_{0.5}B_{0.5})_{25}$ of 2 mm (width)×25 $\mu$m (thickness)×10 mm (length) or as Comparison example 2, an amorphous wire $Fe_{78}Si_{10}B_{12}$ with a diameter of 120 $\mu$m and a length of 10 mm is prepared and embedded in a paper in a size like a beer coupon ticket in the same way as with Embodiment 1.

When the paper in a size like a beer coupon ticket is exposed to light and looked through, the validity determining articles of Embodiment 1 are confused with fibers of the paper and the embedded metallic materials are extremely difficult to be found. However, in Comparison example 1, from the shade different from fibers of the paper, the embedded metallic material can be found easily.

When the flexibility and sense of incompatibility as a paper in which the forgery preventive measure is taken and whether the metallic material embedded for the purpose of forgery prevention can be taken out are checked, there are no problems imposed in the validity determining articles of Embodiment 1 and the embedded locations cannot be identified, so that they cannot be taken out for the purpose of forgery. In Comparison example 1, the portion where the metallic material is embedded has different flexibility from that of the paper, and the embedded portion can be identified from the sense of incompatibility, and the metallic material can be easily taken out by tweezers for the purpose of forgery.

Concretely, the 180° bending experiment is executed continuously 10 times for every sample. As a result, the samples of Comparison example 1 are all broken at the time of third bending, and the broken surfaces are exposed, and the metallic materials can be taken out easily.

Figure 3:
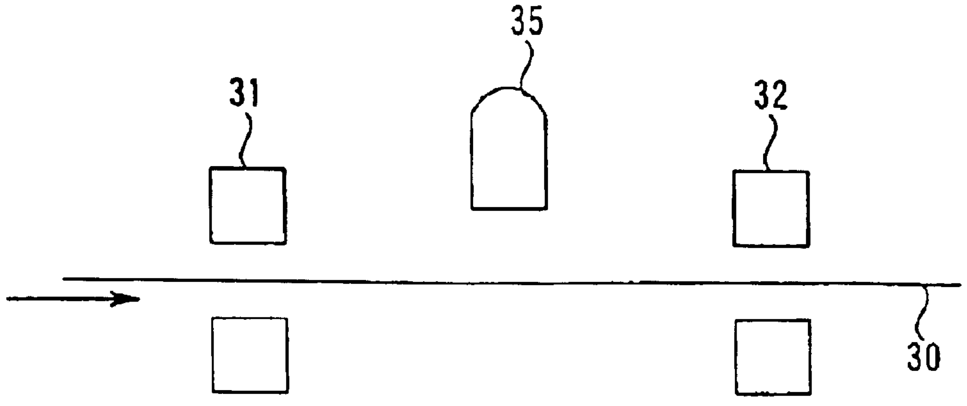
FIG. 3 is a schematic view showing the constitution of a reader used in the present invention.

A schematic view showing the constitution of the reader used in Embodiment 1 is shown in FIG. 3. As shown in the drawing, the reader has a means 30 for conveying an information recording article not shown in the drawing and a first reading sensor 31, a heater 35, and a second reading sensor 32 which are sequentially installed on the conveying means 30.

The validity determining articles (information recording articles) obtained in Embodiment 1 are checked for the output at an exciting frequency of 5 kHz and a magnetic field intensity of 8 A/m using the detecting device shown in FIG. 3. As a result, 200 mVp-p is obtained and when the temperature is raised to 150° C. or higher which is the Curie temperature, the output disappears and when the temperature is returned to the room temperature again, the same output as the initial one is obtained.

As mentioned above, when the soft magnetic alloy fibers of the present invention are compounded with resin or paper sheets, the forgery preventive effect is extremely high and an information-recording article can be formed. As a result, the practical advantage is high and the industrial value is extremely great.

Concretely, the 180° bending experiment is executed continuously 10 times for every sample. As a result, the samples of Comparison example 1 are all broken at the time of third bending and the broken surfaces are exposed.

EMBODIMENT 2 AND COMPARISON EXAMPLES 3 AND 4

The information recording articles used in Embodiment 1 are checked for the output by the detecting head at an exciting frequency of 5 kHz and a magnetic field intensity of 8 A/m.

Figure 4:
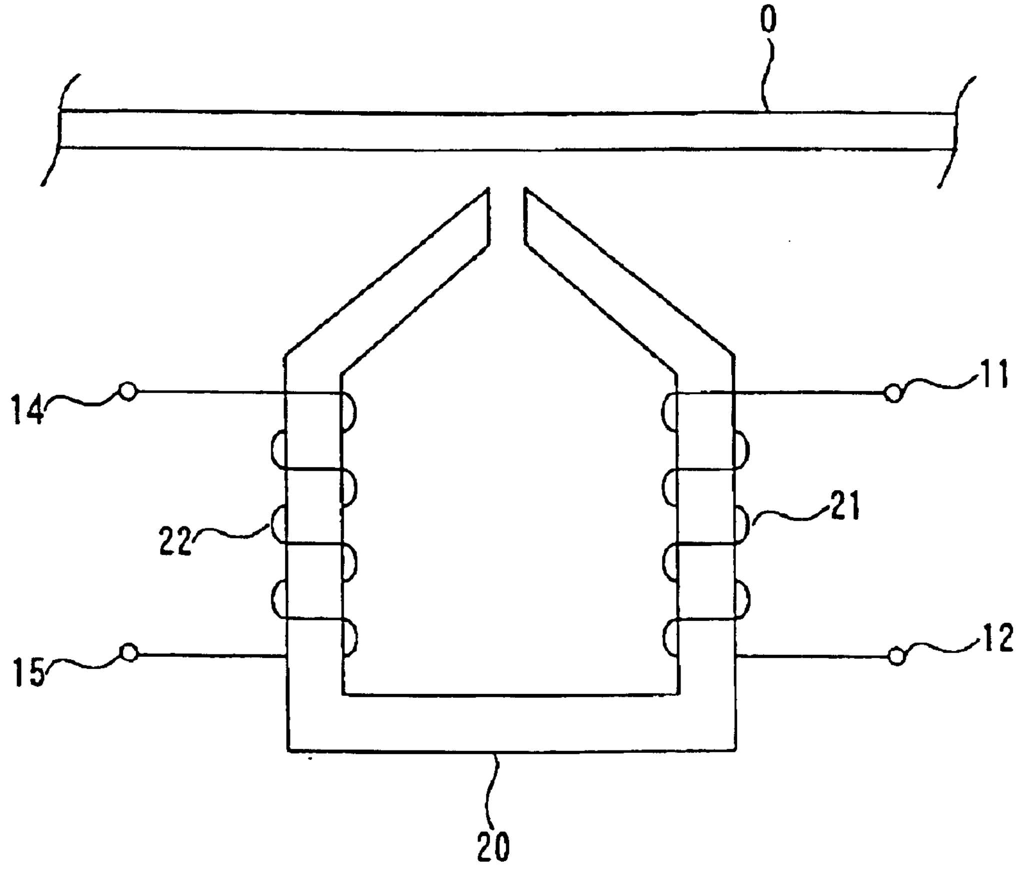
FIG. 4 is a schematic view for explaining the detection situation using a differential magnetic head used in the present invention.

In FIG. 4, a drawing for explaining the detection situation using a differential magnetic head that can be used in Embodiment 2 is shown.

A magnetic head 20 is arranged opposite to a recording medium 40 and as shown in FIG. 4, it has a primary coil 21 having terminals 11 and 12 and a secondary coil 22 having terminals 14 and 15. Two voltage outputs on the side of the secondary coil 22 are amplified using a differential amplifier and can be detected by the voltage difference induced between the terminals 14 and 15.

The detection method using the differential magnetic head 20, generally, when the exciting field on the primary coil side is increased in size, can detect, for example, even a weak voltage signal such as a magnetic tape or magnetic ink. However, the present invention can detect an induced voltage caused by a magnetic flux change that is held by amorphous alloy fibers or iron alloy fibers under the condition that the exciting field is extremely decreased in size. The exciting frequency in this case is preferable to be 100 Hz to 100 MHz. There is a problem imposed that when the exciting frequency is less than 100 Hz, the detecting section is extremely increased in size and when the exciting frequency is more than 100 MHz, the noise of the exciting circuit is increased. In order to make a difference from another material more remarkable, the exciting frequency is preferable to be 1 kHz to 10 MHz. The size of the exciting field is desirable to be within the range from 1 to 800 A/m from the viewpoint of output reliability.

On the other hand, as Comparison example 3, information recording articles are prepared in the same way as with Embodiment 1 except that in place of soft magnetic alloy fibers obtained from an alloy material expressed by $(Co_{0.85}Fe_{0.05}Cr_{0.10})_{75}(Si_{0.5}B_{0.5})_{25}$, nickel-plated carbon fibers with a diameter of 80 $\mu$m and a length of 5 mm are used and the carbon fibers are detected by the detecting head (magnetic head) in the same way.

Further, as Comparison example 4, information recording articles are prepared in the same way as with Embodiment 1 except that in place of soft magnetic alloy fibers obtained from an alloy material expressed by $(Co_{0.85}Fe_{0.05}Cr_{0.10})_{75}(Si_{0.5}B_{0.5})_{25}$, a magnetic wire with a diameter of 10 $\mu$m and a length of 5 mm that acrylic resin and magnetic metallic powder of sendust expressed by $Al_{10.8}Si_{15.5}Fe_{73.7}$ are mixed at a rate of 7:3 is used and the magnetic wire is detected by the detecting head (magnetic head) in the same way.

As a result, the detection output of the information recording articles of Embodiment 2 is large such as 300 to 400 mVp-p, while in the case of Comparison examples 2 and 3, little output is obtained by nickel-plated carbon fibers and when the magnetic wire that acrylic resin and magnetic metallic powder of sendust are mixed is used, the output is 30 mVp-p.

EMBODIMENT 3 AND COMPARISON EXAMPLES 5 AND 6

A thin amorphous alloy ribbon of 50 $\mu$m (width)×6 $\mu$m (thickness)×3 mm (length) having a Curie temperature of 90° C. is obtained in the same way as with Embodiment 1 except that soft magnetic alloy fibers expressed by $(Co_{0.72}Fe_{0.08}Ni_{0.15}Mo_{0.05})_{75}(Si_{0.5}B_{0.5})_{25}$ are used. The obtained thin amorphous alloy band is cut into pieces, and about 30 pieces are suitably arranged on a PET film with a thickness of 0.2 mm having an adhesion layer, and another PET film with a thickness of 0.2 mm having an adhesion layer is additionally overlaid on it, and the whole is hot-pressed and then punched in a cash card size so as to obtain information recording articles.

On the other hand, as Comparison example 5, a thin Co group amorphous alloy ribbon of 2 mm (width)×25 μm (thickness)×3 mm (length) having a Curie temperature of 370° C. or as Comparison example 6, an amorphous wire of a composition of $Fe_{78}Si_{10}B_{12}$ with a diameter of 100 μm and a length of 3 mm having a Curie temperature of 440° C. is embedded in an information recording article in a size of a cash card in the same way.

When the uneven parts of the surface of this information recording article in a size of a cash card is looked at, in the information recording article of the present invention, there are no unnatural uneven parts to look at and the embedded location cannot be identified. In Comparison example 5, there are slightly unnatural uneven parts to look at, and it is estimated that something is embedded, and it may be said that the forgery preventive effect is low. In Comparison example 6, there are clearly unnatural uneven parts to look at, and it is ascertained that something is embedded, and it may be said that the forgery preventive effect is low.

EMBODIMENT 4 AND COMPARISON EXAMPLES 7 AND 8

Information recording articles prepared in the same way as with Embodiment 3 are checked by the detecting head at an exciting frequency of 5 kHz and an exciting field of 8 A/m. On the other hand, as Comparison example 7, Ni-plated carbon fibers with a diameter of 50 μm and a length of 5 mm or as Comparison example 4, a magnetic polymer with a diameter of 10 μm and a length of 5 mm that acrylic resin and a magnetic metallic powder of Mo permalloy expressed by $Ni_{78}Fe_{20}Mo_2$ are mixed at a rate of 7:3 is used, and evaluation samples are prepared like Embodiment 3, and the samples are also detected by the detecting head as shown in FIG. 4.

As a result, the detection output of the information recording articles of Embodiment 4 is large such as 300 to 400 mVp-p, while in the case of the samples of the comparison examples, little output is obtained by nickel-plated carbon fibers and when the wire that acrylic resin and magnetic metallic powder of Mo permalloy are mixed is used, the output is 30 mVp-p.

EMBODIMENTS 5 TO 30 AND COMPARISON EXAMPLES 9 AND 10

Information recording articles are prepared from each material of 80 μm (width)×6 μm (thickness)×3 mm (length) shown in Table 1 indicated below in the same way as with Embodiment 3 and checked by the detecting head in the same way at an exciting frequency of 10 kHz and an exciting field of 4 A/m. The uneven parts on the surface are evaluated visually, and a double circle is allocated to each satisfactory part, and x is allocated to an unsatisfactory part as evaluation. The obtained results are shown in Table 1 indicated below. Fe group alloy fibers are made amorphous by the same method and heat-treated at a crystallization temperature of 50° C. or higher of the respective alloy fibers so as to deposit fine crystals. The X-ray diffraction method and Scherrer formula obtain the crystal particle diameter.

Further, as Comparison example 9, $Fe_2O_3$ formed as paint is coated in a thickness of 3 μm on a PET film with a thickness of 0.2 mm, and another PET film with a thickness of 0.2 mm is overlaid on it, and the whole is hot-pressed and then punched in a cash card size so as to produce information recording articles. The detecting head also detects the information recording articles and uneven parts are evaluated.

Furthermore, information recording articles are prepared in the same way as with Embodiment 3 except that a thin Fe group amorphous alloy ribbon of 2 mm (width)×25 μm (thickness)×3 mm (length) expressed by $Fe_{78}Si_9B_{13}$ is used in place of the thin amorphous alloy ribbon of Embodiment 3 and also detected by the detecting head and uneven parts are evaluated.

The obtained results are shown in Table 1 indicated below.

As a result, the information recording articles of Embodiments 5 to 30 in which soft magnetic alloy fibers are embedded are free of uneven parts on the surface and the detection output is 300 to 400 mVp-p. On the other hand, in the samples of Comparison examples 9 and 10, the information recording articles with $Fe_2O_3$ formed as paint coated are free of uneven parts on the surface, though the detection output is low such as 20 mVp-p and in the thin Fe group amorphous alloy band expressed by $Fe_{78}Si_9B_{13}$, although slight detection output such as 100 mVp-p is obtained, the uneven parts on the surface are unnatural and it may be said that the forgery preventive effect is low.

TABLE 1

| | | COMPOSITION | UNEVEN PARTS ON SURFACE | OUTPUT (mVp-p) | COERCIVE FORCE (A/M) |
|---|---|---|---|---|---|
| EMBODIMENTS | 5 | $(Co_{0.85}Fe_{0.05}V_{0.10})_{75}(Si_{0.4}B_{0.6})_{25}$ | ◎ | 300 | 2.0 |
| | 6 | $(Co_{0.87}Fe_{0.03}Mn_{0.10})_{72}(Si_{0.5}B_{0.5})_{28}$ | ◎ | 400 | 1.6 |
| | 7 | $(Co_{0.67}Fe_{0.08}Ni_{0.25})_{73}(Si_{0.7}B_{0.3})_{27}$ | ◎ | 370 | 2.3 |
| | 8 | $(Co_{0.87}Fe_{0.05}Cu_{0.08})_{70}(Si_{0.4}B_{0.6})_{30}$ | ◎ | 330 | 3.0 |
| | 9 | $(Co_{0.85}Fe_{0.05}Ti_{0.10})_{75}(Si_{0.1}B_{0.9})_{25}$ | ◎ | 320 | 3.2 |
| | 10 | $(Co_{0.87}Fe_{0.05}Zr_{0.08})_{71}(Si_{0.1}B_{0.9})_{29}$ | ◎ | 330 | 3.0 |
| | 11 | $(Co_{0.87}Fe_{0.05}Hf_{0.08})_{71}(Si_{0.5}B_{0.5})_{29}$ | ◎ | 310 | 3.9 |
| | 12 | $(Co_{0.85}Fe_{0.05}Nb_{0.10})_{75}(Si_{0.5}B_{0.5})_{25}$ | ◎ | 380 | 2.0 |
| | 13 | $(Co_{0.85}Fe_{0.05}Ta_{0.10})_{75}(Si_{0.5}B_{0.5})_{25}$ | ◎ | 400 | 1.6 |
| | 14 | $(Co_{0.85}Fe_{0.05}Mo_{0.10})_{75}(Si_{0.5}B_{0.5})_{25}$ | ◎ | 420 | 1.2 |
| | 15 | $(Co_{0.85}Fe_{0.05}Wo_{0.10})_{75}(Si_{0.5}B_{0.5})_{25}$ | ◎ | 410 | 1.4 |
| | 16 | $(Fe_{0.5}Ni_{0.5})_{74}Cu_1Nb_{3.5}Si_{14}B_{7.5}$ | ◎ | 300 | 1.6 |
| | 17 | $(Fe_{0.5}Ni_{0.5})_{72}Cu_1Nb_{3.5}Cr_{1.5}Si_{14}B_8$ | ◎ | 310 | 4.0 |
| | 18 | $(Fe_{0.5}Ni_{0.5})_{72}Cu_1Mo_{3.5}Cr_{1.5}Si_{14}B_8$ | ◎ | 300 | 4.0 |
| | 19 | $(Fe_{0.5}Ni_{0.5})_{72}Cu_1Ta_{3.5}Cr_{1.5}Si_{14}B_8$ | ◎ | 320 | 4.0 |
| | 20 | $(Fe_{0.4}Ni_{0.6})_{72}Cu_1W3_{3.5}Cr_{1.5}Si_{14}B_8$ | ◎ | 310 | 4.0 |
| | 21 | $(Fe_{0.4}Ni_{0.6})_{72}Cu_1Hf_{3.5}Cr_{1.5}Si_{14}B_8$ | ◎ | 280 | 4.4 |
| | 22 | $(Fe_{0.4}Ni_{0.6})_{72}Cu_1Zr_{3.5}Cr_{1.5}Si_{14}B_8$ | ◎ | 290 | 4.4 |
| | 23 | $(Fe_{0.4}Ni_{0.6})_{71.5}Cu_1Ti_{5.0}Cr_{2.5}Si_{13}B_8$ | ◎ | 260 | 6.0 |

TABLE 1-continued

| | | COMPOSITION | UNEVEN PARTS ON SURFACE | OUTPUT (mVp-p) | COERCIVE FORCE (A/M) |
|---|---|---|---|---|---|
| | 24 | $(Fe_{0.4}Ni_{0.6})_{70.5}Cu_1V_7Cr_{2.0}Si_{13}B_8$ | ⊚ | 300 | 4.0 |
| | 25 | $(Fe_{0.9}Ni_{0.1})_{72}Cu_1Mo_{3.5}Cr_{1.5}Si_{14}B_8$ | ⊚ | 280 | 5.6 |
| | 26 | $(Fe_{0.8}Co_{0.2})_{72}Cu_1Mo_{3.5}Cr_{1.5}Si_{14}B_8$ | ⊚ | 250 | 5.8 |
| | 27 | $(Fe_{0.6}Ni_{0.4})_{72}Cu_1Ta_{3.0}Cr_{1.5}Mn_{0.5}Si_{14}B_8$ | ⊚ | 330 | 3.2 |
| | 28 | $(Fe_{0.6}Ni_{0.4})_{72}Cu_1W_{3.5}Cr_{1.0}Ga_{0.5}Si_{14}B_8$ | ⊚ | 340 | 3.0 |
| | 29 | $(Fe_{0.6}Ni_{0.4})_{72}Cu_1Nb_{3.5}Cr_{1.0}Sn_{0.5}Si_{14}B_8$ | ⊚ | 320 | 3.2 |
| | 30 | $(Fe_{0.6}Ni_{0.4})_{72}Cu_1Mo_{3.5}Cr_{1.0}Al_{1.5}Si_{13}B_8$ | ⊚ | 330 | 3.2 |
| COMPARISON EXAMPLES | 9 | $Fe_2O_3$ | ⊚ | 20 | 2000 |
| | 10 | $Fe_{78}Si_9B_{13}$ | x | 100 | 80 |

EMBODIMENT 31 AND COMPARISON EXAMPLES 11 AND 12

As soft magnetic alloy fibers, two kinds of amorphous fibers are prepared in the same way as with Embodiment 1 except that an alloy $(Co_{0.90}Fe_{0.05}Cr_{0.05})_{75}(Si_{0.5}\ B_{0.5})_{25}$ having a Curie temperature of 200° C. and an alloy $(Co_{0.84}Fe_{0.05}Cr_{0.11})_{75}(Si_{0.5}\ B_{0.5})_{25}$ having a Curie temperature of 60° C. are used. Each fiber is cut into pieces with a length of about 5 to 10 mm and each piece is inserted into paper during manufacture at a rate of 1:2.

On the other hand, as Comparison examples 11 and 12, ink including $CrO_2$ having a Curie temperature of 128° C. and CrTe having a Curie temperature of 95° C. as a magnetic pigment is prepared and printed on papers.

These samples are applied to the detecting device shown in FIG. 3 and the output when the samples are evaluated at the room temperature and the output when the samples are evaluated after heating them to the Curie temperature or higher are compared. The evaluation device is installed beside the detecting head so that the heater is set to 130° C. and requires instant temperature perception.

As a result, in the samples of Embodiment 31, even if this operation is repeated 100 times, when the heater is in operation, an output signal is not output from the fiber section having a Curie temperature of 130° C. but output is obtained only from the fiber section having a Curie temperature of 200° C. On the other hand, in the case of $CrO_2$ relating to Comparison examples 11 and 12, with respect to the output signal when the heater is in operation, the value is 20 to 30% of that at the room temperature and sufficient binary coding cannot be performed. Further, the output itself is small and it is necessary to increase the gain by one digit compared with the measuring condition of the present invention. Therefore, the SN ratio gets worse extremely. Even in the case of magnetic ink using CrTe, increasing or decreasing the temperature causes property deterioration. This seems to be property deterioration due to oxidation. Therefore, it can be ascertained that the present invention is well responsive to the temperature and excellent in the heat resistance.

EMBODIMENT 32

Figure 5:
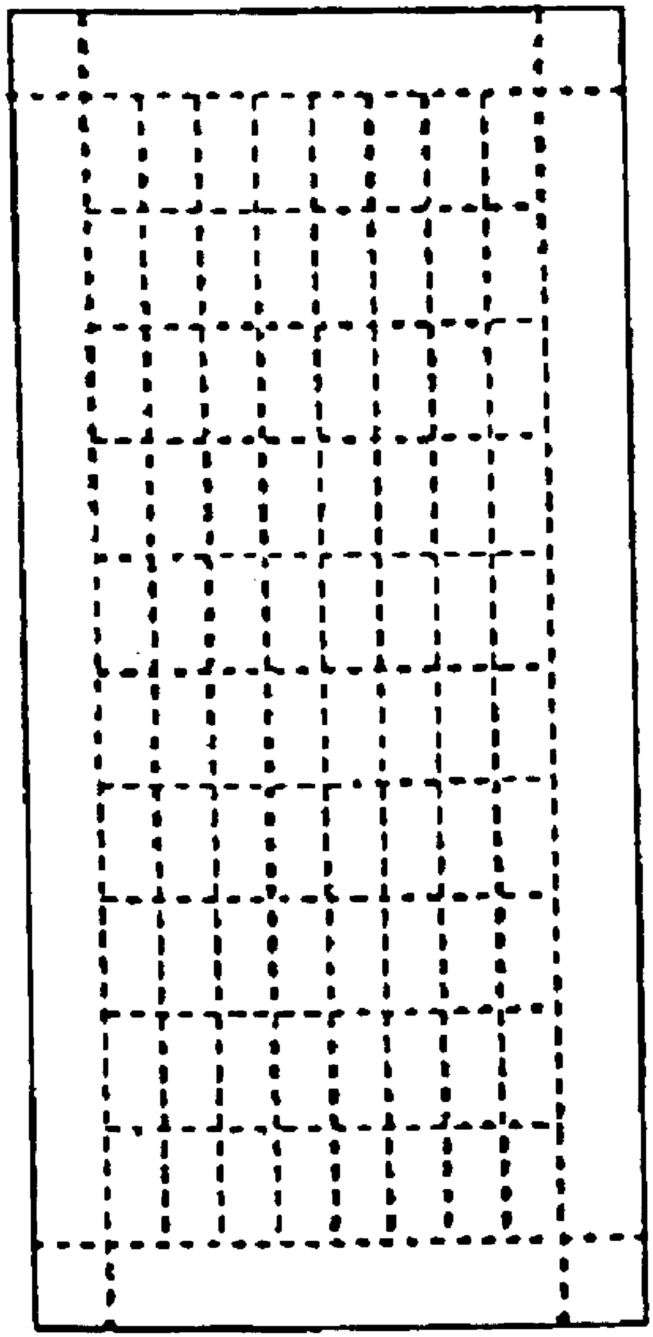
FIG. 5 is a plan view showing a matrix assumed in a preferable application example of an information recording article of the present invention.
Figure 6:
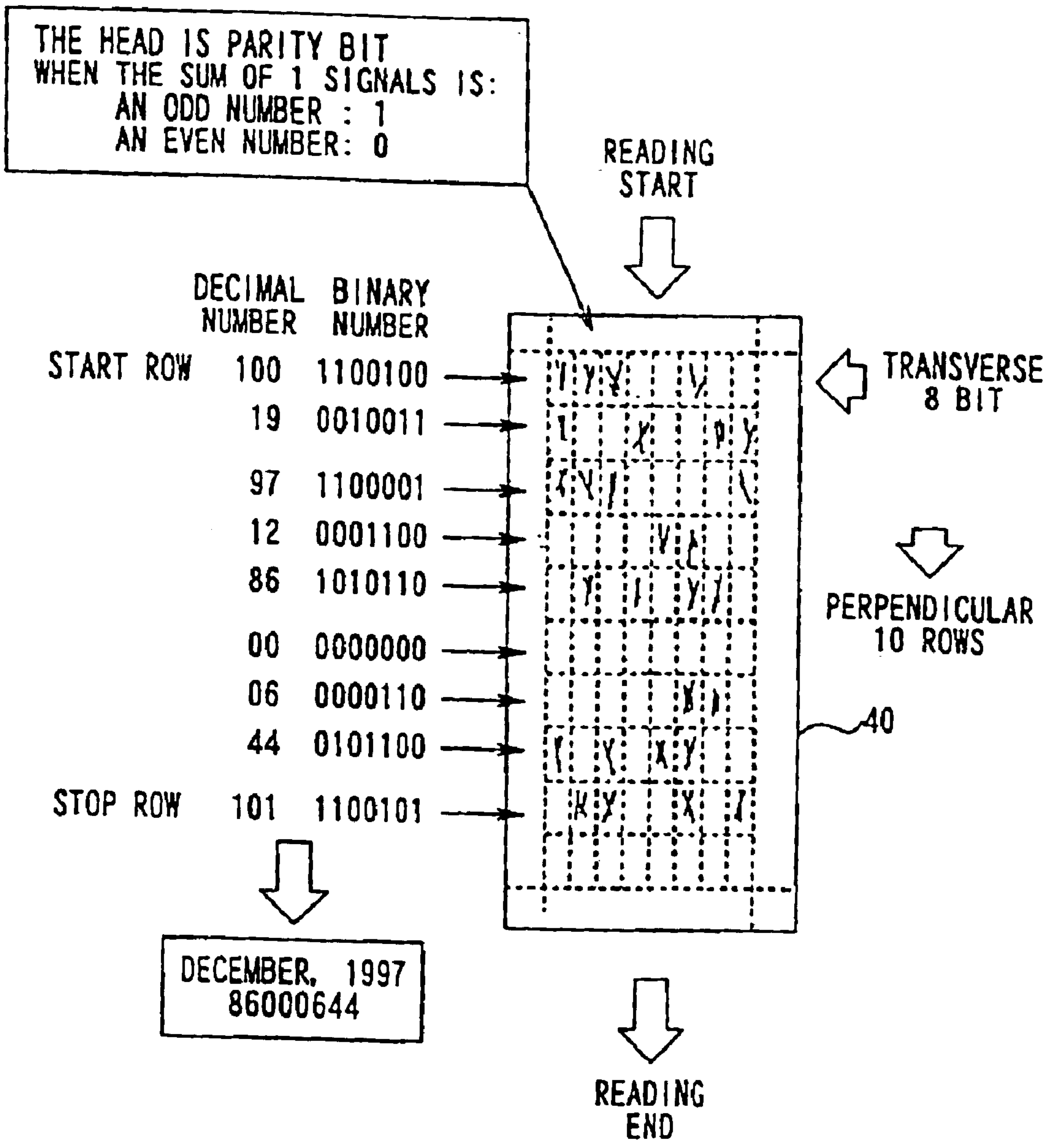
FIG. 6 is a drawing for explaining arrangement of amorphous alloy fibers embedded in a preferable application example of an information recording article of the present invention and a reading method therefor.
Figure 7:
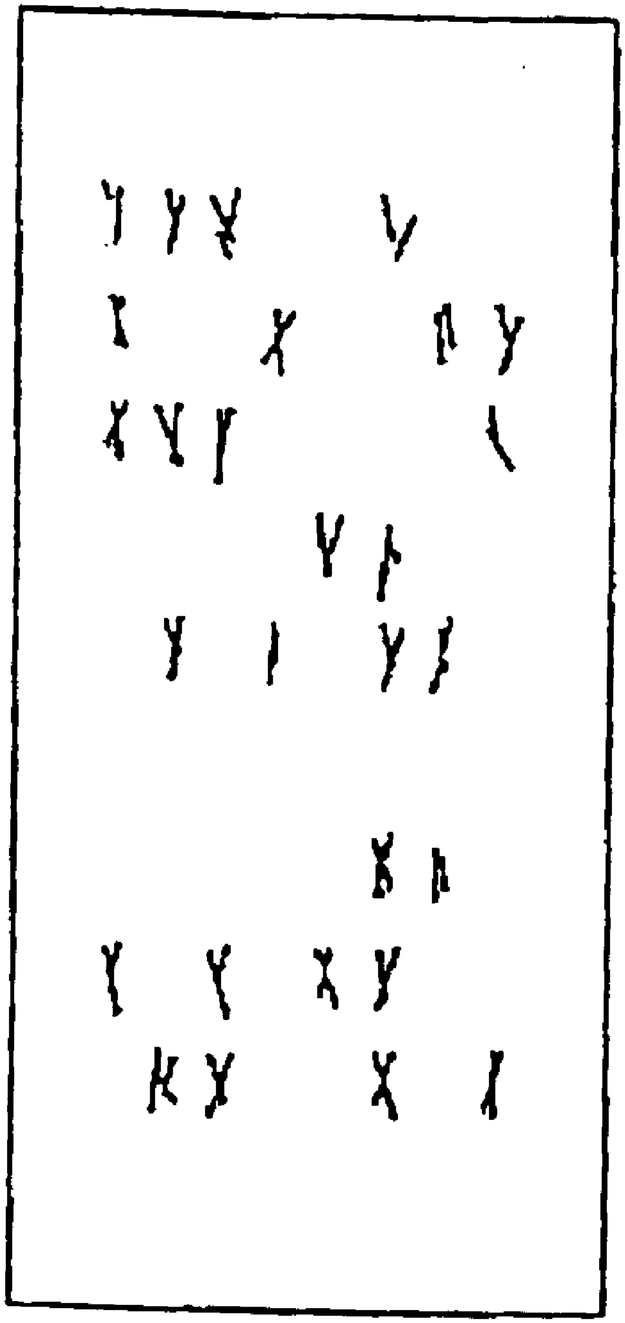
FIG. 7 is a plan view that the dashed lines indicating the divided areas are removed from FIG. 6.

FIG. 5 shows a matrix assumed in a preferable application example of an information-recording article of the present invention. FIG. 6 is a drawing for explaining divided areas of a matrix assumed in a preferable application example of an information recording article of the present invention, arrangement of amorphous alloy fibers selectively embedded in the divided areas, and a reading method therefor. FIG. 7 is a drawing that the dashed lines indicating the divided areas are removed from FIG. 6.

On a paper layer 40 immediately after manufactured and dehydrated, a matrix as indicated by dashed lines in FIG. 5 is assumed and 2 to 4 amorphous alloy fibers of 50 μm (width)×6 μm (plate thickness)×3 mm (length) expressed by $(Co_{0.84}Fe_{0.05}Nb_{0.11})_{75}(Si_{0.5}B_{0.5})_{25}$ in the same way as with Embodiment 1 are arranged in a single division of the assumed matrix indicated by dashed lines. As shown in FIG. 7, when the dashed lines are removed, it is not easy to judge what a matrix is assumed from the random arrangement of the amorphous alloy fibers. Furthermore, a paper layer immediately after manufactured and dehydrated is overlaid on it, and the whole is hot-pressed and then wound, and one sheet of paper with a thickness of about 80 μm is formed. The paper is punched in a size of about 160 mm×76 mm so as to obtain information recording articles.

When the information recording articles are exposed to light and looked through, the information recording articles of Embodiment 32 are confused with fibers of the paper and the embedded amorphous ally fibers are extremely difficult to be found.

When the flexibility and sense of incompatibility as a paper of an information recording article and whether the soft magnetic alloy fibers embedded for the purpose of forgery can be taken out are checked, there are no problems imposed in the information recording articles of the present invention and the embedded locations cannot be identified, so that they cannot be taken out for the purpose of forgery.

Concretely, the 180° bending experiment is executed continuously 10 times for every sample and the samples are neither broken nor exposed on the surface.

For reading of information of the amorphous alloy fibers, by moving an information recording article at 28 mm/s by a reader that 8 contact type magnetic heads are arranged in a horizontal line and by converting the read waveform every channel from analog to digital as required, the existence of a bit is determined depending on whether a signal reaches the normal voltage at an interval of 0.5 s. In the drawing, the top of one bit is a parity bit.

Figure 8:
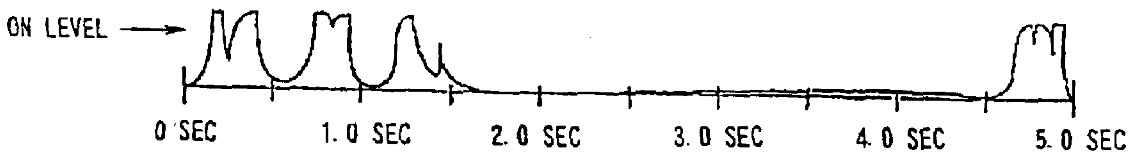
FIG. 8 is a graph showing an example of a reading waveform diagram.

FIG. 8 shows an example of a reading waveform diagram. As shown in FIG. 8, it looks likely that the waveform is not regular at a glance. However, when a rule that when the voltage reaches the ON level at least once at an interval of 0.5 s, there is a bit is known, the digital information as shown in FIG. 6 can be read from this waveform. When this embodiment is heated up to 80° C. and evaluated in the same way, it can be ascertained that no reading waveform can be obtained at all and different information is provided.

According to the present invention, soft magnetic alloy fibers that can be compounded easily with a base, are high in the security property and forgery preventive effect, and can read at high output and high speed can be obtained.

Further, when the soft magnetic alloy fibers of the present invention are used, information recording articles which are high in the security property and forgery preventive effect, can read at high output and high speed, and can easily determine the validity can be obtained.

Furthermore, according to the manufacturing method for soft magnetic alloy fibers of the present invention, soft magnetic alloy fibers which are high in the security property and forgery preventive effect and can read at high output and high speed can be easily manufactured.

What is claimed is:

1. An information recording article comprising:

a base; and a soft magnetic alloY fiber havina a width of 10 $\mu$m or more to less than 500 $\mu$m, a plate thickness of 2 $\mu$m or more to less than 20 $\mu$m, and a Curie temperature between −50° C. and 150° C. which is embedded in the base.

2. An information recording article according to claim 1, wherein the base is at least one kind of nonmagnetic material selected from a paper sheet and synthetic resin.

3. An information recording article according to claim 2, wherein a ratio of a sectional area (Ap) of fibers of the paper sheet to a sectional area (Am) of the soft magnetic alloy fiber is $0.1 \leqq Ap/Am \leqq 20$.

4. An information recording article according to claim 1, wherein the soft magnetic alloy fiber has a length of 0.1 mm or longer.

5. An information recording article according to claim 1, wherein the soft magnetic alloy fiber is an amorphous alloy.

6. An information recording article according to claim 1, wherein the soft magnetic alloy fiber includes cobalt as a main component.

7. An information recording article according to claim 1, wherein the soft magnetic alloy fiber includes iron as a main component.

8. An information recording article according to claim 7, wherein the soft magnetic alloy fiber including iron as a main component includes fine crystals having a mean crystal particle diameter of 5 nm or more to 50 nm or less.

9. An information recording article according to claim 1, wherein the information recording article further includes another soft magnetic alloy fiber having another Curie temperature different from the Curie temperature of the soft magnetic alloy fiber.

10. An information recording article according to claim 1, wherein the soft magnetic alloy fiber is selectively embedded in divided areas assumed in the base and existence of embedding of the alloy fiber is recording information.

11. An information recording article according to claim 1, wherein the information recording article includes still another soft magnetic alloy fiber having another coercive force different from coercive force of the soft magnetic alloy fiber.

* * * * *